(12) United States Patent
Dumas

(10) Patent No.: US 7,565,958 B1
(45) Date of Patent: Jul. 28, 2009

(54) TORQUE CONVERTER RACE KIT

(75) Inventor: Andrew D. Dumas, Jericho, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 367 days.

(21) Appl. No.: 11/405,388

(22) Filed: Apr. 17, 2006

(51) Int. Cl.
*F16H 45/02* (2006.01)

(52) U.S. Cl. .................. 192/3.29; 192/DIG. 1

(58) Field of Classification Search .......... 192/70.13, 192/DIG. 1
See application file for complete search history.

(56) References Cited

U.S. PATENT DOCUMENTS

| | | | | |
|---|---|---|---|---|
| 6,662,446 | B2 * | 12/2003 | Yamanaka et al. | 29/889.5 |
| 6,902,046 | B1 * | 6/2005 | Dumas | 192/41 A |
| 7,290,987 | B1 * | 11/2007 | Morin | 416/171 |
| 2007/0137421 | A1 * | 6/2007 | Reid | 74/572.2 |

* cited by examiner

*Primary Examiner*—Richard M. Lorence
(74) *Attorney, Agent, or Firm*—Downs Rachlin Martin PLLC; Clifford Rey

(57) ABSTRACT

A hybrid GENERAL MOTORS 4L80E torque converter and a method of converting a GENERAL MOTORS 4T40E torque converter core into the present hybrid GENERAL MOTORS 4L80E torque converter for high performance applications. The present invention includes GENERAL MOTORS 4L80E compatible parts, which are provided in a race kit format to complete the conversion. The present kit includes a hybrid impeller hub, a hybrid turbine hub, a hybrid one-way roller clutch, a hybrid front cover pilot, an adapter ring, a thrust washer, and a set of machine screws. In a method of the present invention the GENERAL MOTORS 4T40E torque converter core undergoes multiple machining operations to remove the original equipment impeller hub, turbine hub, and front cover pilot from the GENERAL MOTORS 4T40E torque converter core, which are each replaced by their counterparts in the present race kit to complete the conversion to the hybrid GENERAL MOTORS 4L80E torque converter.

5 Claims, 16 Drawing Sheets

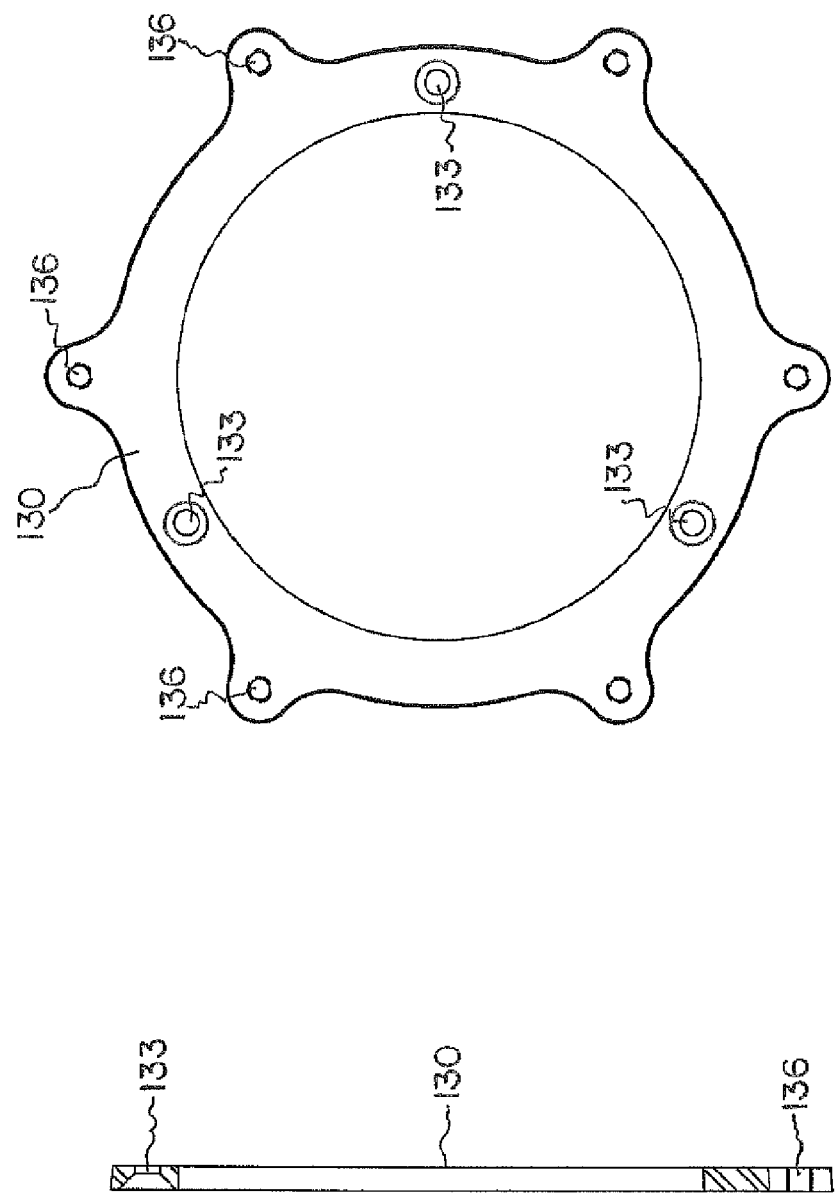

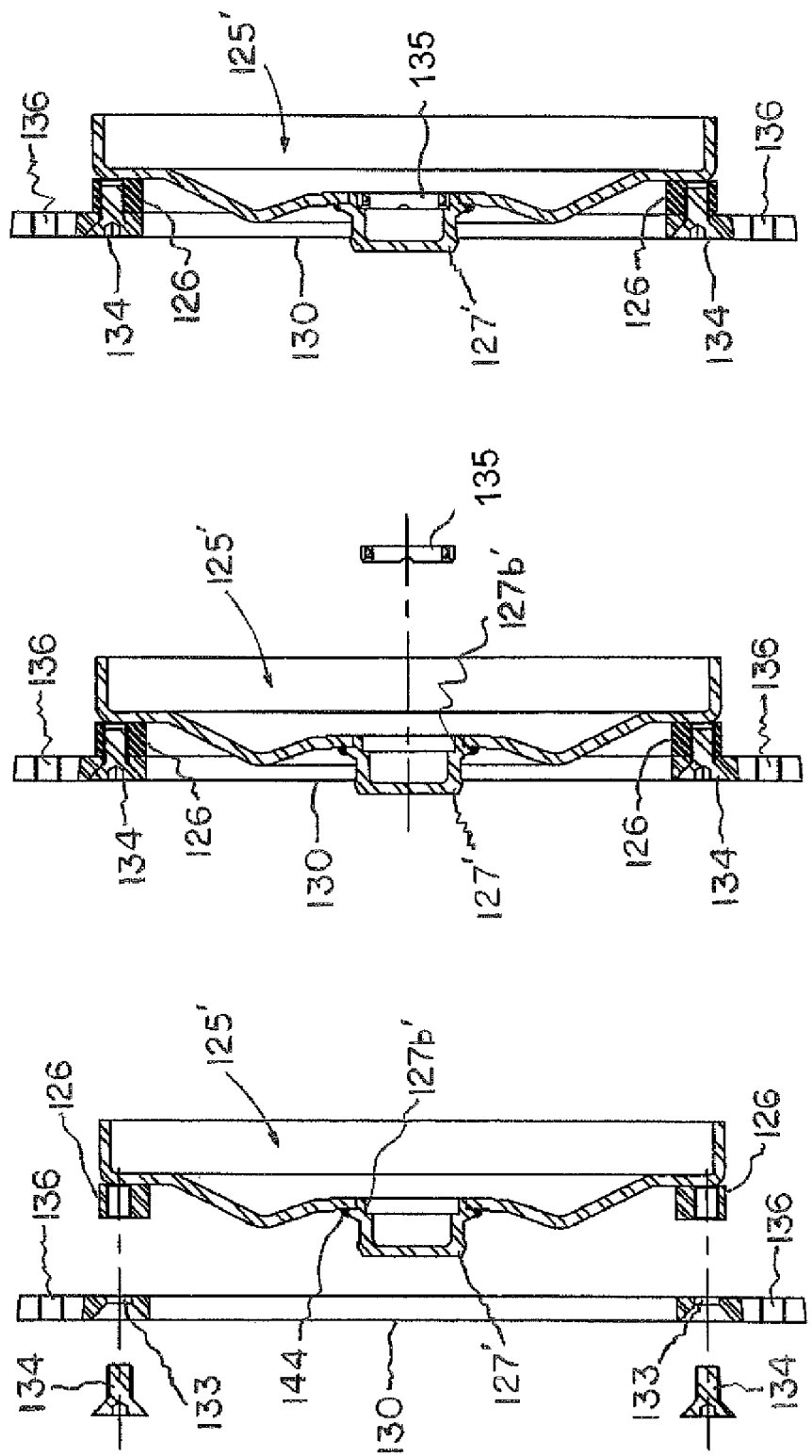

TORQUE CONVERTER RACE KIT

BACKGROUND OF THE INVENTION

The present invention relates to automotive transmission systems and, more particularly, to a hybrid torque converter for a GENERAL MOTORS (hereinafter "GM") 4L80E transmission, which includes redesigned torque converter components for converting a stock GM 4T40E torque converter core for installation in a high performance GM 4L80E transmission.

For purposes of this application the term "hybrid" will be understood to define a torque converter having components with features and characteristics derived from two or more stock torque converters and, more particularly, a hybrid torque converter having component parts derived from both the GM 4T40E and the GM 4L80E torque converters. The term "stock" will be understood to define a torque converter assembly or a component thereof which is original equipment manufacture (hereinafter "OEM") as distributed from GENERAL MOTORS Corporation.

Automatic overdrive transmissions have become the preferred setup of many street rod and racing enthusiasts. This technology allows the use of low gear ratios for performance while not interfering with highway cruising and fuel mileage due to the substantial revolutions per minute (hereinafter "RPM") reduction that their fourth gear overdrive provides.

The GM 4L80E automatic transmission is stock equipment for GM truck and SUV applications (e.g. Truck C/K series, Yukon, Suburban, Tahoe). With GM's latest refinements and electronic controls, the 4L80E transmission is stronger and much smarter than its predecessors. When modified for all-out performance, the GM 4L80E stands alone as the ultimate racing transmission setup and is the first choice of many high performance enthusiasts.

In contrast the GM 4T40E transaxle, which is stock equipment on mid-size passenger vehicles (e.g. Malibu, Cavalier), features many available stator and impeller combinations capable of delivering a wider range of torque multiplication and stall speeds (i.e. K-factors), which are matched to the torque curve of a particular engine. Advantageously, the GM 4T40E transaxle also features a smaller diameter (i.e. 245 millimeter) torque converter core having less rotating mass than its GM 4L80E counterpart.

Thus, the present invention has been developed to transform the more versatile, lightweight torque converter core of the GM 4T40E transaxle into a hybrid GM 4L80E torque converter for installation in a GM 4L80E transmission to improve its performance in selected applications.

SUMMARY OF THE INVENTION

Accordingly, the present invention provides a hybrid GM 4L80E torque converter and a method of converting a stock GM 4T40E torque converter core into the present hybrid torque converter for installation in a GM 4L80E automatic transmission for high performance applications. The present hybrid torque converter includes redesigned GM 4L80E compatible parts, which are provided in a so-called race kit, to complete the conversion, namely: (1) a hybrid impeller hub, (2) a hybrid turbine hub, (3) a hybrid one-way roller clutch, (4) a hybrid front cover pilot, (5) an adapter ring, (6) a thrust washer, and (7) a set of flat head machine screws.

In a method of the present invention, the stock GM 4T40E torque converter core undergoes multiple machining operations to remove the OEM impeller hub, the OEM turbine hub, and the OEM front cover pilot from the GM 4T40E torque converter core, which stock parts are each replaced by their counterparts in the race kit to complete the conversion to the present hybrid GM 4L80E torque converter.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 11A is a longitudinal cross-section of an adapter ring of the present invention;

FIG. 11B is a plan view of the present adapter ring shown in FIG. 11A;

FIG. 15A is a partially exploded, longitudinal cross-section view showing the present adapter ring prior to attachment to the present front cover assembly of FIG. 14B;

FIG. 15B is a partially exploded, longitudinal cross-section view showing the present thrust washer prior to installation in the present front cover assembly with the adapter ring attached thereto; and FIG. 15C is a longitudinal cross-section view showing the present thrust washer installed in the present front cover assembly with the adapter ring of FIG. 15A attached thereto.

DETAILED DESCRIPTION OF THE PREFERRED EMBODIMENTS

Figure 1:
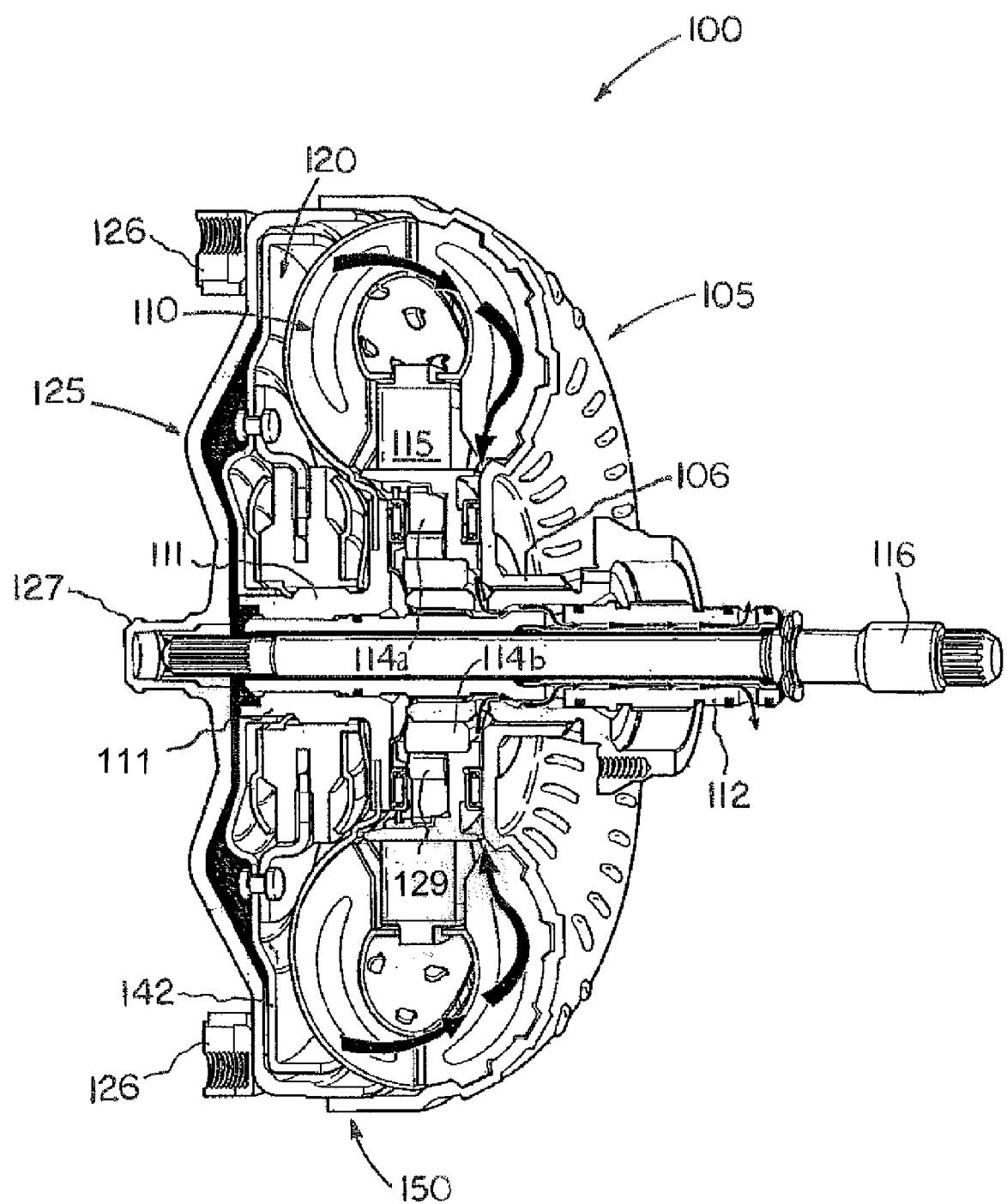
FIG. 1 is a cross-sectional view of a GM 4T40E torque converter assembly illustrating the internal components thereof and is labeled Prior Art.

Prior to describing the present invention in detail, it may be beneficial to briefly review the structure and function of the OEM torque converter of a GM 4T40E transmission wherein the present invention is utilized. With further reference to the drawings there is shown therein a cross-sectional view of such a torque converter assembly, indicated generally at 100 and illustrated in FIG. 1, which is the primary component for transmittal of power between the engine and the automatic transmission or transaxle in an automotive vehicle. The torque converter assembly 100 provides for a smooth conversion of torque from the engine to the mechanical components of the automatic transmission and also functions to multiply torque from the engine enabling the vehicle to achieve additional performance when necessary.

Torque converter assembly 100 is comprised of the following main sub-assemblies: (1) an impeller assembly, indicated generally at 105, including an impeller hub 106, which is the driving member; (2) a turbine assembly, indicated generally at 110, including a turbine hub 111, which is the driven member; (3) a stator assembly, indicated generally at 115, (4) a lock-up clutch assembly, indicated generally at 120, which engages the turbine assembly 110 to enable direct mechanical drive; and (5) a front cover assembly, indicated generally at 125, which is typically welded to the impeller assembly 105 as at 150.

Cover assembly 125 is also attached to the engine flexplate (not shown) by machine screws that engage threaded bosses 126 so that the cover will rotate at engine speed. Cover assembly 125 includes a cover pilot 127 to center the torque converter assembly 100 in coaxial relation to the engine crankshaft (not shown). When the engine is running, the impeller assembly 105 acts as a centrifugal pump by picking up automatic transmission fluid (hereinafter "ATF") at its center and discharging it at its rim. The force of the ATF flow from the impeller assembly 105 is directed into the turbine assembly 110 and causes it to rotate. As the engine and impeller assembly 105 increase in speed, so does the turbine assembly 110 including turbine shaft 112 to mechanically operate the transmission via input shaft 116.

The lock-up clutch assembly 120 includes a lock-up piston 142 having friction material on a forward facing surface thereof, and is mechanically attached (i.e., splined) to the turbine hub 111 as shown. In operation lock-up piston 142 is shifted axially forward by ATF pressure and frictionally engages an inner surface of cover 125 to provide a direct mechanical coupling of the engine to the transmission during the torque converter lock-up cycle. When the lock-up clutch assembly 120 is applied, the slippage that occurs through the fluid coupling is eliminated providing a direct mechanical drive for efficient transfer of engine torque to the drive wheels.

Figure 2:
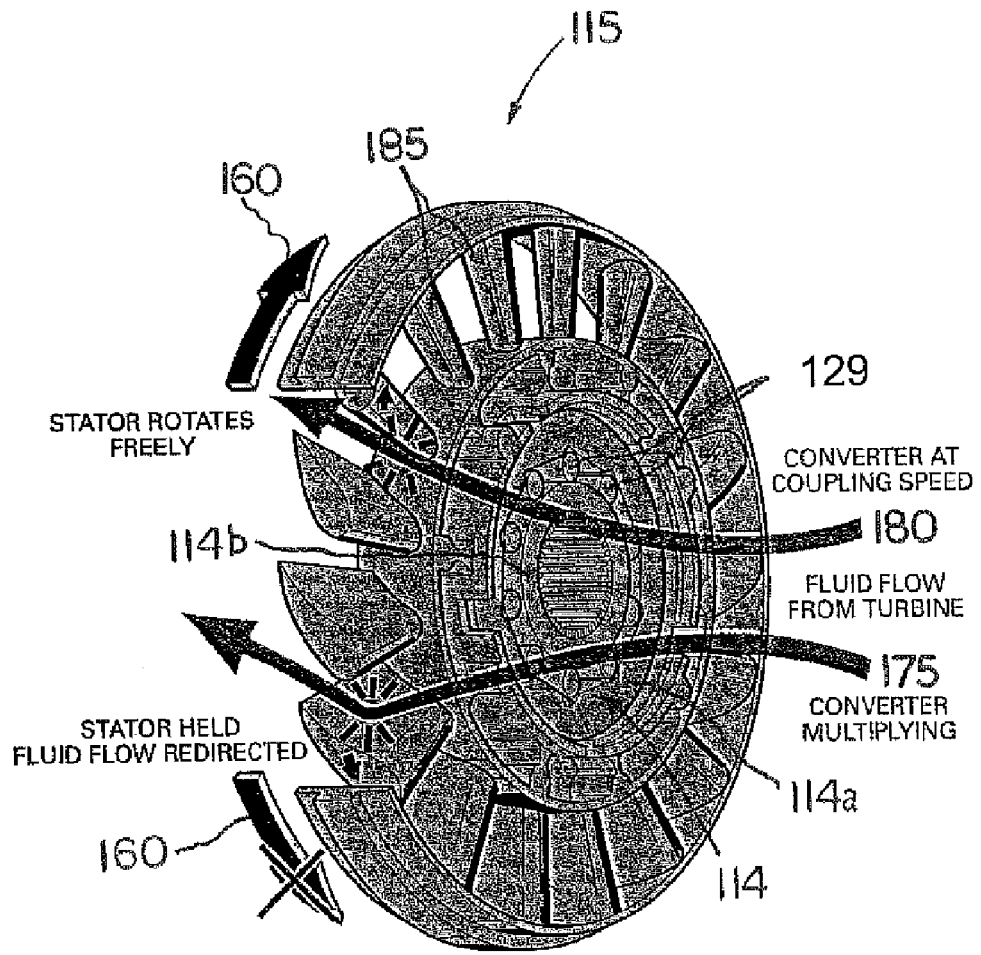
FIG. 2 is a perspective view of a stator assembly and is labeled Prior Art.

The stator assembly 115 (FIG. 2) is located between the impeller assembly 105 and turbine assembly 110, and is mounted on a one-way roller clutch assembly 114. One-way roller clutch assembly 114 includes an outer race 114a an inner race 114b, and a plurality of roller bearings 129 captured there between. As seen in FIG. 2 the one-way clutch assembly 114 allows the stator assembly 115 to rotate only in one direction and prevents the stator from rotating in the other direction as shown by directional arrows 160.

Still referring to FIG. 2 the function of the stator assembly is to redirect ATF returning from the turbine assembly 110 (represented by directional arrows 175, 180) to assist the engine in turning the impeller assembly 105. At low speeds when greater torque is needed, ATF flow from the turbine assembly 110 hits the front side of the stator blades as at 175 and the stator is held stationary. The one-way roller clutch 114 prevents the stator from rotating in the same direction as the ATF flow thereby redirecting ATF to assist the engine in turning the impeller assembly 105. As a result ATF leaving the impeller assembly 105 has more force to turn the turbine assembly 110 and multiplies engine torque.

As engine speed increases the speed of the impeller assembly 105 and the turbine assembly 110 become nearly the same. Because the turbine assembly 110 is spinning faster than the ATF can exit from its radial chambers, the net angular momentum of the exiting ATF is in the same direction as the turbine's rotation rather than opposite its rotation. As the impeller approaches this speed, the torque multiplication provided by the stator 115 decreases. At that critical speed (i.e. the converter's coupling speed) the ATF strikes the backside of the stator blades as at 180 (FIG. 2) causing the stator 115 to rotate freely (i.e. freewheel) so that it will not interfere with the return flow of ATF to the impeller 105. The maximum amount of torque multiplication provided by the stator 115 depends on the angle and design of its blades 185. The blade angle and shape also affects the stall speed (or so-called K-factor) of the stator 115. Stall speed is the maximum RPM the engine and impeller assembly 105 can turn when the turbine assembly 110 is held stationary and torque is applied.

While stator multiplication increases the torque delivered to the input shaft 116, it also increases the slippage within the torque converter and raises the temperature of the ATF thereby reducing overall efficiency. For this reason the characteristics of the torque converter must be matched to the torque curve of the engine and the vehicle application. For example, drag racing transmissions often use torque converters with high stall speeds to improve off-the-line torque because converter efficiency at cruising speeds is not significant.

Figure 3:
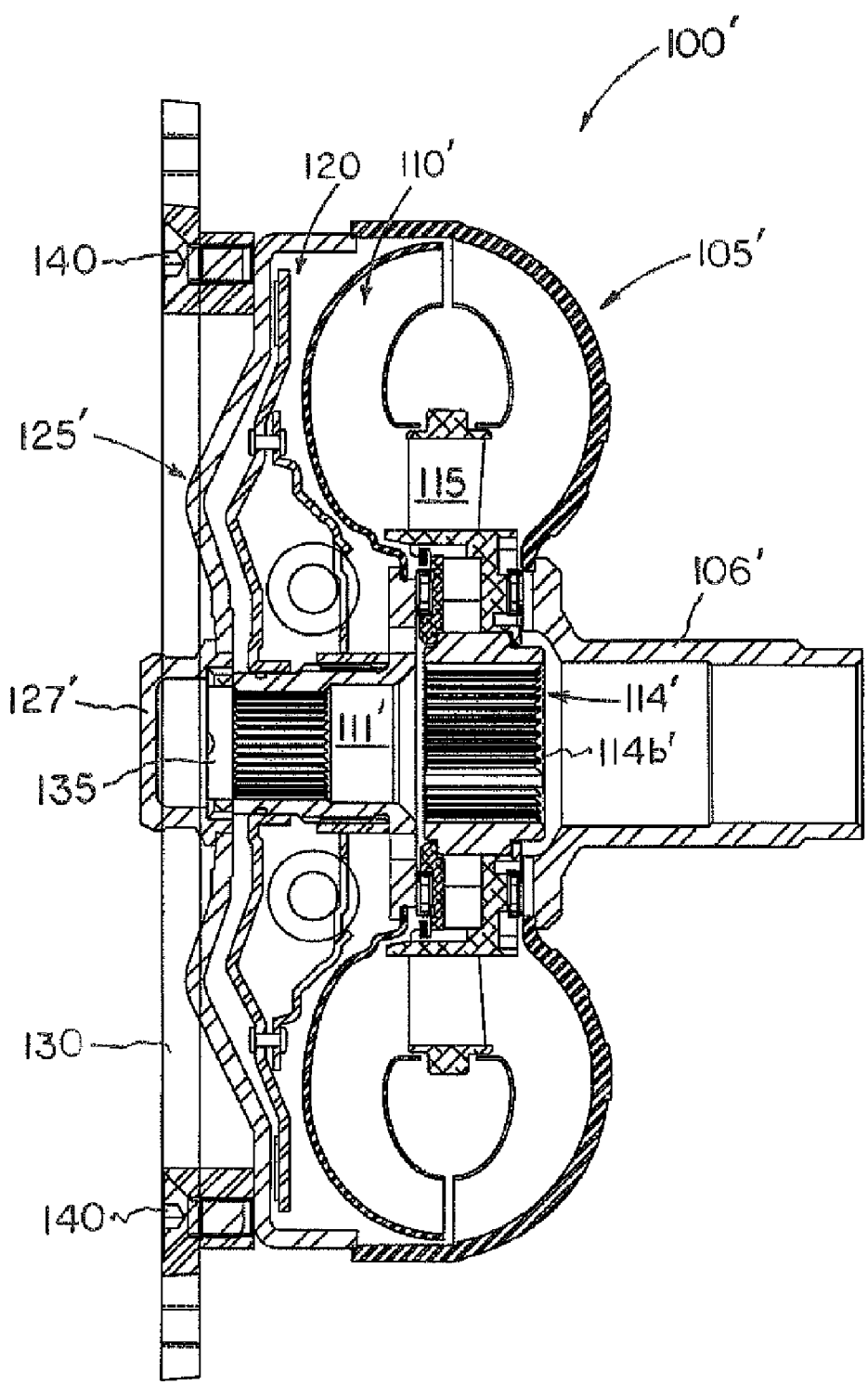
FIG. 3 is a cross-sectional view of a hybrid GM 4T40E torque converter adapted for installation in the GM 4L80E transmission in accordance with the present invention.

For this reason the present invention has been developed to provide a hybrid GM 4L80E torque converter assembly comprised of redesigned GM 4L80E compatible parts in kit form to convert the stock GM 4T40E torque converter 100 (FIG. 1) into the present hybrid GM 4L80E torque converter, indicated generally at 100' and illustrated in FIG. 3.

Still referring to FIG. 3, the present hybrid GM 4L80E torque converter 100' comprises the following subassemblies: (1) a hybrid impeller, indicated generally at 105', including impeller hub 106'; (2) a hybrid turbine, indicated generally at 110', including turbine hub 111'; (3) a hybrid one-way roller clutch, indicated generally at 114', including a hybrid inner race 114b'; (4) an OEM lock-up clutch assembly, indicated generally at 120, which is attached to the hybrid turbine 110' to provide direct mechanical drive during lock-up; (5) a hybrid front cover, indicated generally at 125', including a hybrid cover pilot 127', (6) an adapter ring 130 for attaching the hybrid front cover 125' to the engine flexplate (not shown), (7) a thrust washer 135; and (8) a set of machine screws 140 for attachment of the adapter ring 130 to the hybrid front cover 125'.

Figure 4B:
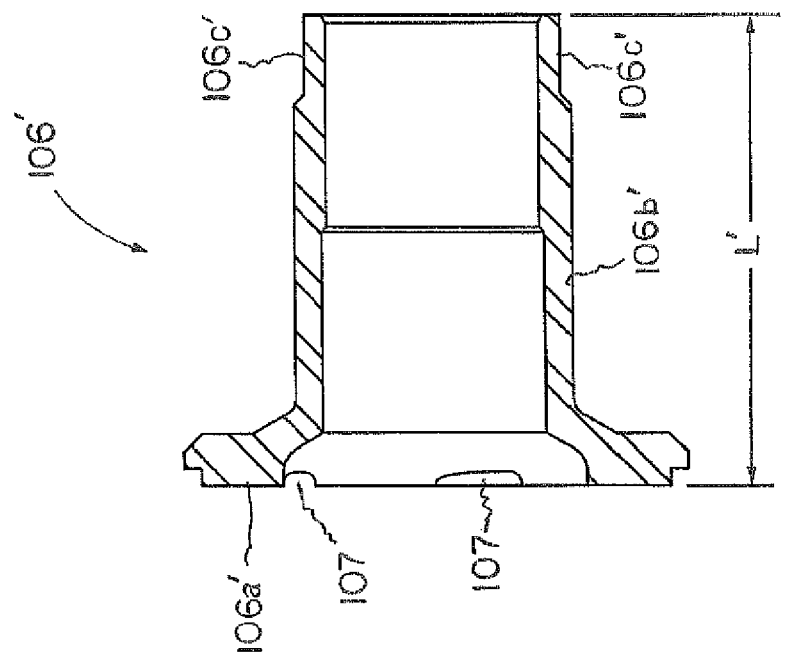
FIG. 4B is a longitudinal cross-section of the present impeller hub rotated 90° from the position shown in FIG. 4A.
Figure 4A:
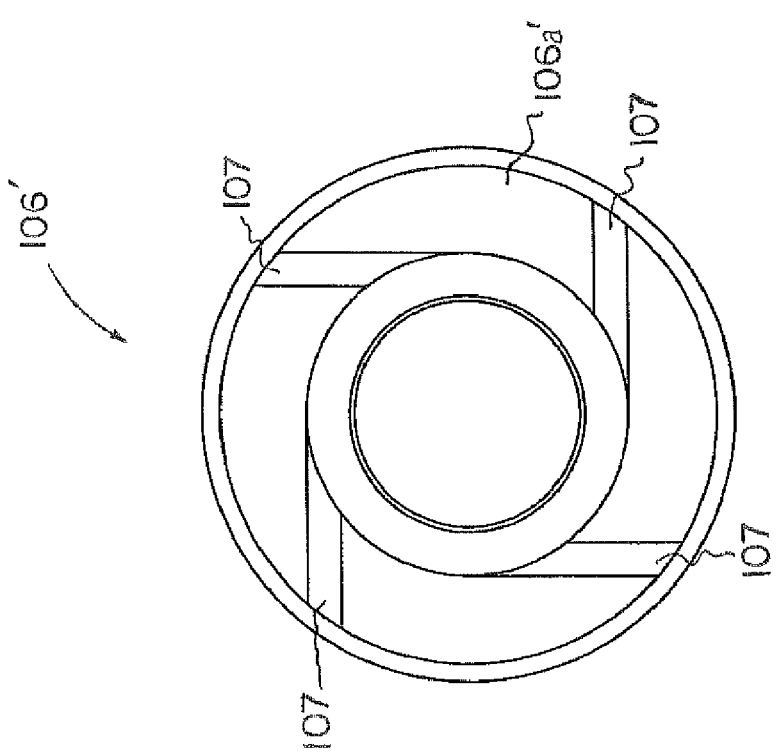
FIG. 4A is an end view of a hybrid impeller hub of the present invention.
Figure 4C:
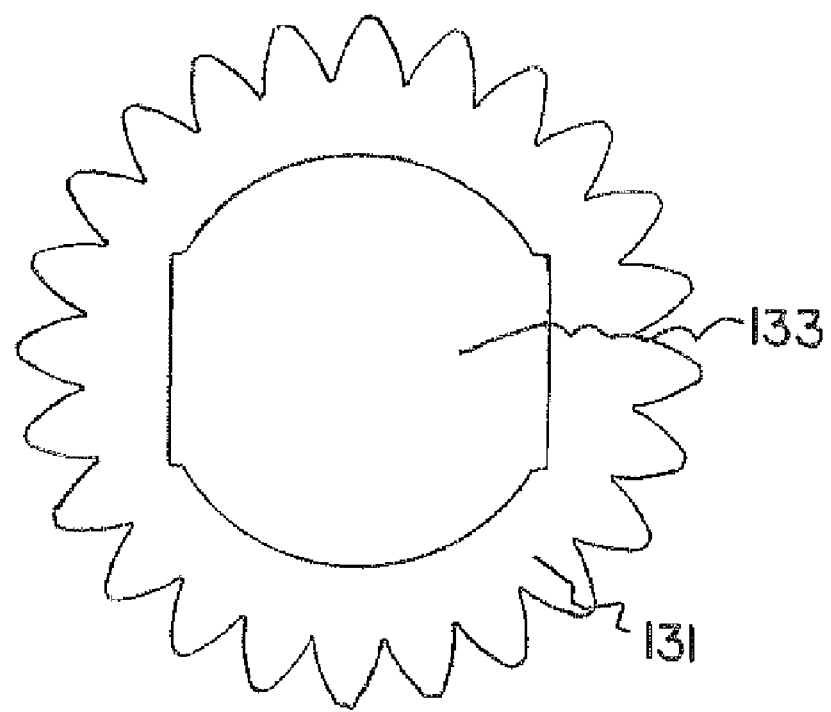
FIG. 4C is a plan view of a GM 4L80E pump gear having a double D-shaped bore for engagement with the present impeller hub of FIGS. 4A-4B.
Figure 5B:
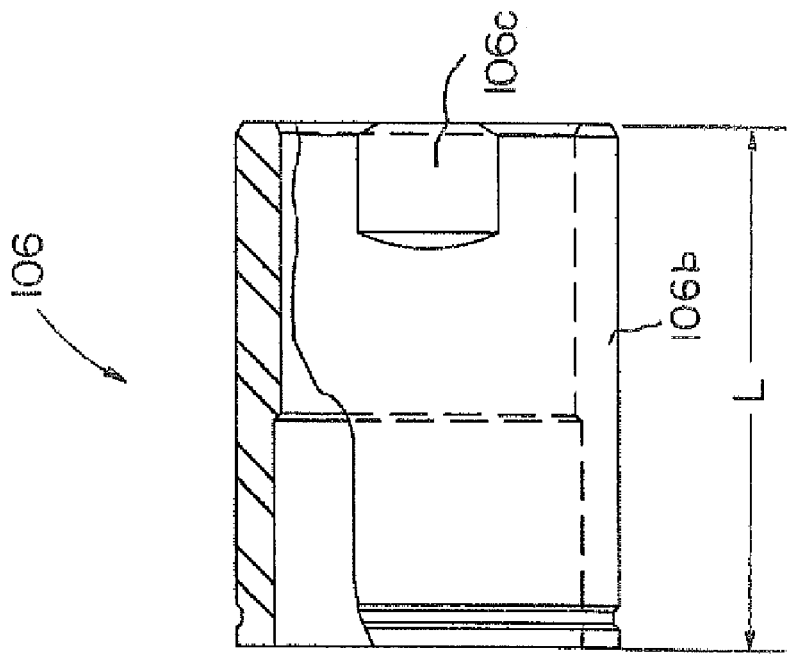
FIG. 5B is a longitudinal cross-section of the OEM impeller hub of the GM 4T40E torque converter rotated 90° from the position shown in FIG. 5A and is labeled Prior Art.
Figure 5A:
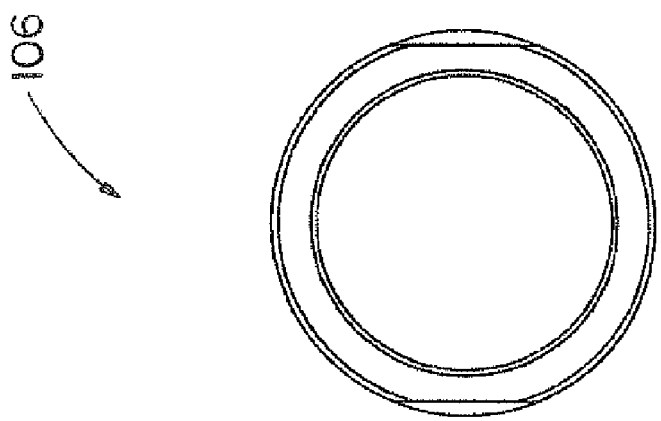
FIG. 5A is an end view of an OEM impeller hub for the GM 4T40E torque converter and is labeled Prior Art.

More particularly, the present torque converter 100' includes a hybrid impeller hub 106' as shown in FIGS. 4A and 4B which is configured for mating engagement within the GM 4T40E torque converter core. FIGS. 5A and 5B illustrate the OEM impeller hub 106 from the GM 4T40E for purposes of comparison. Initially, it can be seen that in the present invention the OEM impeller hub 10 has been transformed from a so-called butt-type hub (FIGS. 5A-5B) having a cylindrical body member 106b to a flange-type hub 106' (FIGS. 4A-4B) including an integral flange 106a' disposed in perpendicular relation to a cylindrical body member 106b'. In the present invention the overall axial length -L'- of the present impeller hub 106' has been increased in comparison to length -L- of the OEM hub 106 (FIGS. 5A-5B) to conform present hub 106' to the required axial stack-up length of the GM 4L80E transmission after assembly. A distal end of impeller hub 106' includes flats 106c' machined thereon for engagement with a mating double-D shaped opening 133 formed in the pump gear 131 (FIG. 4C) of the GM 4L80E transmission. The present hub 106' also includes ATF galleries 107 formed in the end face thereof for lubrication purposes as most clearly shown in FIG. 4A. The installation of the present impeller hub 106' is described hereinafter in further detail.

Figure 6B:
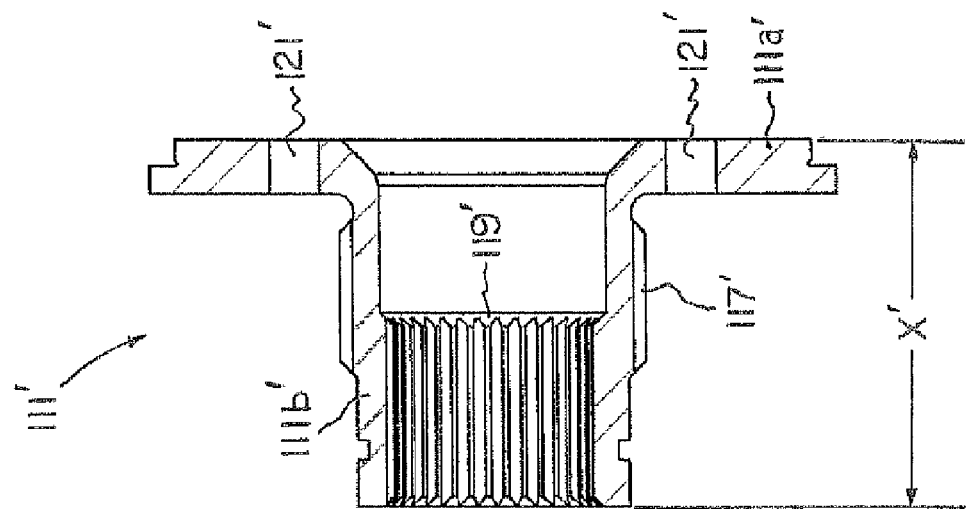
FIG. 6B is a longitudinal cross-section of the present turbine hub rotated 90° from the position shown in FIG. 6A.
Figure 6A:
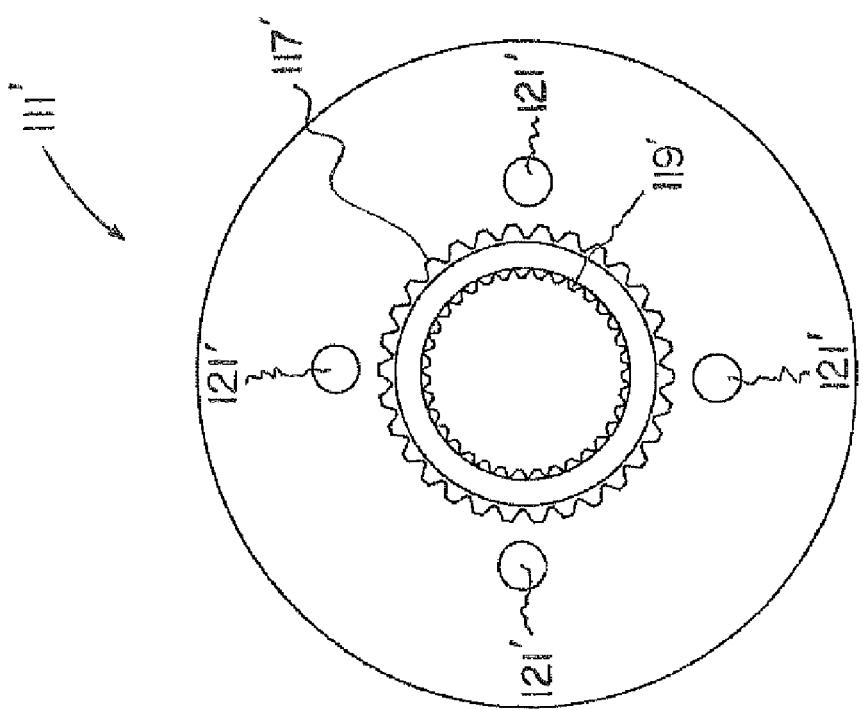
FIG. 6A is an end view of a hybrid turbine hub of the present invention.
Figure 7B:
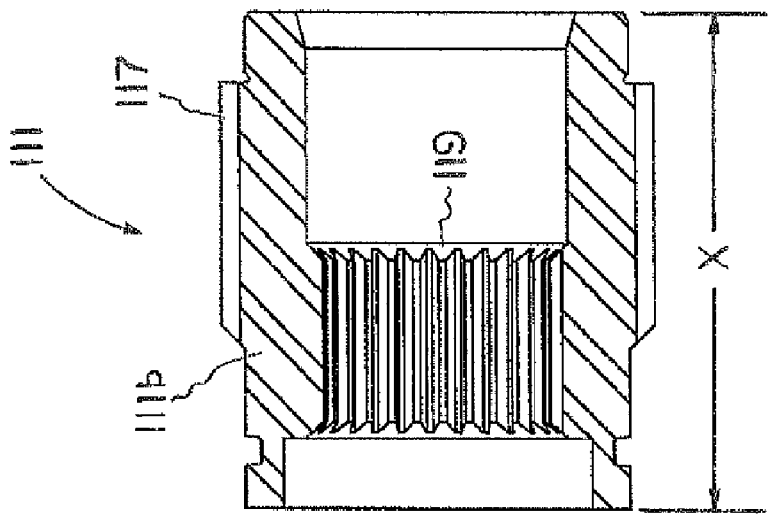
FIG. 7B is a longitudinal cross-section of the OEM turbine hub of the GM 4T40E torque converter rotated 90° from the position shown in FIG. 7A and is labeled Prior Art.
Figure 7A:
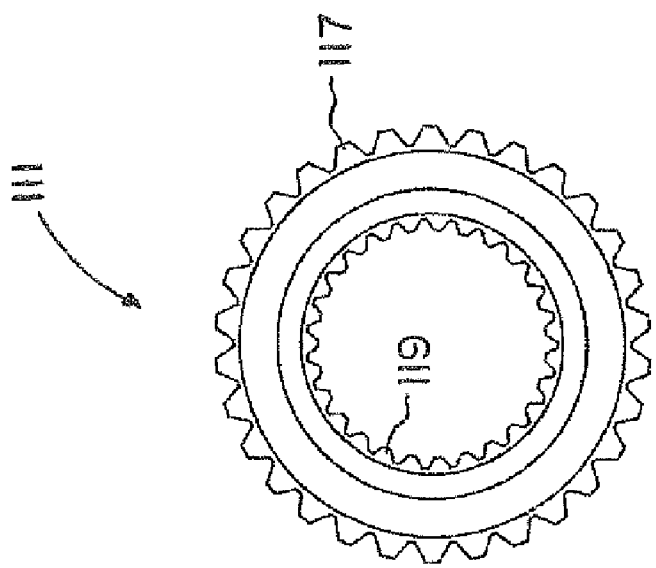
FIG. 7A is an end view of an OEM turbine hub of the GM 4T40E torque converter and is labeled Prior Art.

The present torque converter assembly 100' also includes a hybrid turbine hub 111' as shown in FIGS. 6A and 6B which is redesigned for attachment to the 4T40E converter 100 and for mating engagement with the GM 4L80E turbine shaft (not shown). FIGS. 7A and 7B depict the OEM turbine hub 111 from the GM 4T40E for purposes of comparison. It can be seen that in the present invention the OEM turbine hub 111 has also been transformed from a so-called butt-type hub (FIGS. 7A-7B) having a generally cylindrical body member 111b to a flange-type hub 111' (FIGS. 6A-6B) including an integral flange 111a' disposed in perpendicular relation to a cylindrical body member 111b'. In the present invention the overall axial length -X'- of the hybrid turbine hub 111' has been increased in comparison to length -X- of the OEM hub 111 to conform the present hub 111' to the required axial stack-up length of the GM 4L80E transmission after assembly.

It will be appreciated that the present turbine hub 111' includes an external spline 117' having the same number of teeth (i.e. 30 teeth external) and having a major diameter equal to that of the OEM turbine hub 111 for mating engagement with the lock-up clutch assembly 120 of the GM 4T40E torque converter core (FIG. 3).

However, the internal spline 119' has a greater number of teeth (i.e. 35 teeth internal) and a larger major diameter than the OEM internal spline 119 (FIGS. 7A-7B) to provide for mating engagement with the turbine shaft (not shown) of the GM 4L80E transmission. The flange member 111a' of the present turbine hub 111' includes a pattern of holes 121' which are positioned at 90 degree intervals for lubrication purposes. The installation of the present turbine hub 111' is described hereinafter in further detail.

Figure 8B:
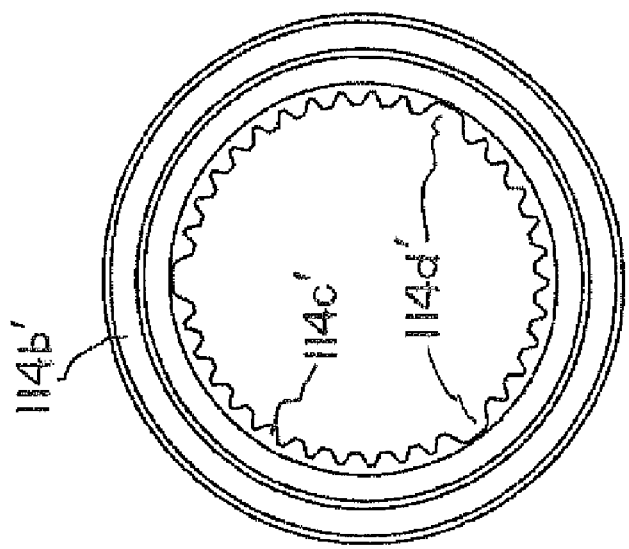
FIG. 8B is an end view of the present inner race shown in FIG. 8A.
Figure 8A:
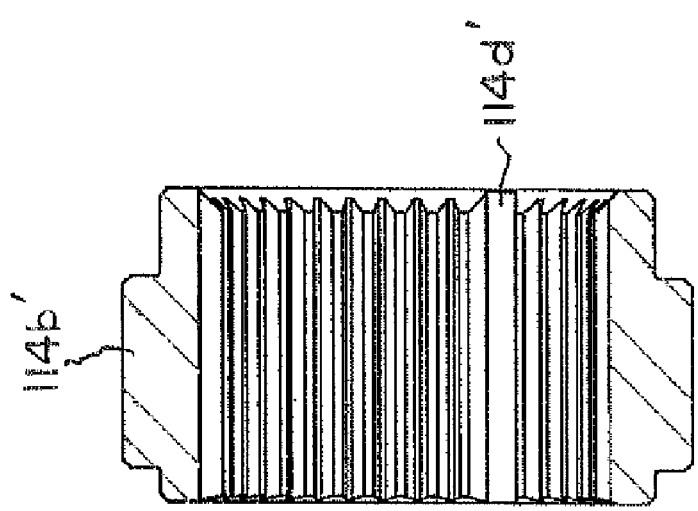
FIG. 8A is a longitudinal cross-section of the present inner race for the hybrid one-way roller clutch of the present invention.

The present hybrid torque converter assembly 100' also provides a hybrid one-way roller clutch 114' which resides in the OEM stator 115 of the 4T40E torque converter 100. One-way roller clutch 114' includes a hybrid inner race 114b' (FIGS. 8A-8B) that is designed for mating engagement with the GM 4L80E transmission. More particularly, hybrid inner race 114b' includes an internal spline 114c' (i.e. 37 teeth internal) that is configured for mating engagement with the GM 4L80E stator shaft (not shown). It will be noted that internal spline 114c' provides so-called missing teeth 114d' disposed at 120 degree intervals to enable axial ATF flow between the internal spline 114c' and the GM 4L80E stator shaft ensuring critical lubrication within the present torque converter assembly 100'.

The OEM stator 115 itself remains unchanged in the present hybrid GM 4L80E torque converter assembly 100'. It is reiterated that any OEM stator 115 available for the stock GM 4T40E torque converter 100 may be utilized in the present hybrid torque converter assembly 100' by installation of the hybrid one-way roller clutch 114' including the hybrid inner race 114b' described hereinabove.

Figure 9B:
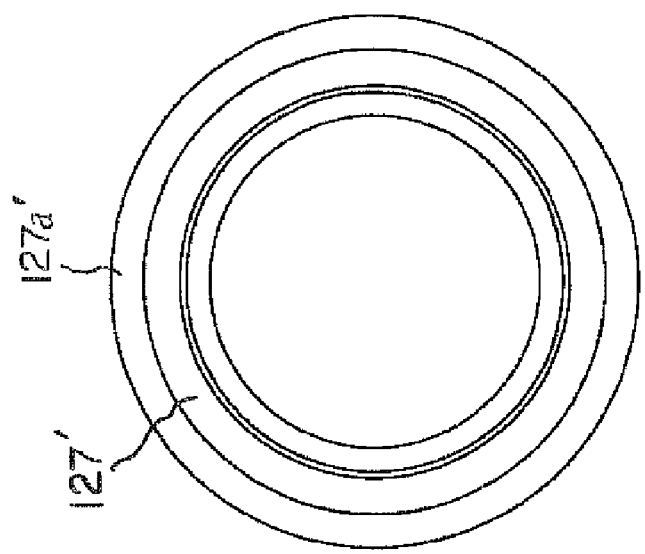
FIG. 9B is an end view of the present cover pilot shown in FIG. 9A.
Figure 9A:
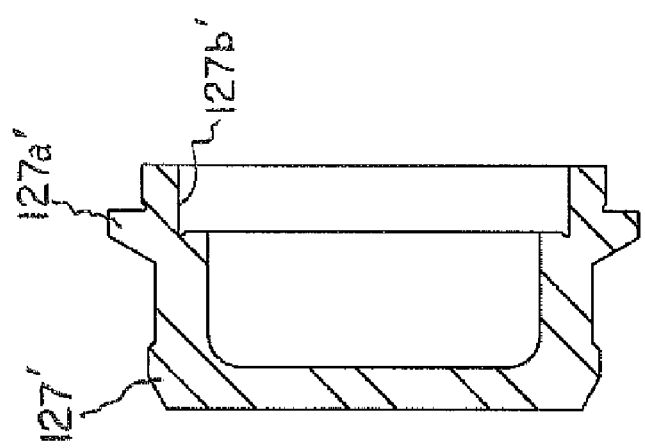
FIG. 9A is a longitudinal cross-section of the hybrid cover pilot of the present invention.

The torque converter assembly 100' also includes a hybrid cover pilot 127' (FIGS. 9A-9B) which is redesigned for mating engagement with a V-8 engine crankshaft (not shown) that is typically matched to GM 4L80E transmission. In comparison to the cover pilot 127 of the GM 4T40E (FIG. 1), it can be seen that the cover pilot 127' of the present torque converter assembly 100' (FIG. 3) is larger in diameter and includes a peripheral flange 127a' for weldment to the front cover 125 (FIG. 14A) of the GM 4T40E torque converter core as hereinafter explained.

Figure 10B:
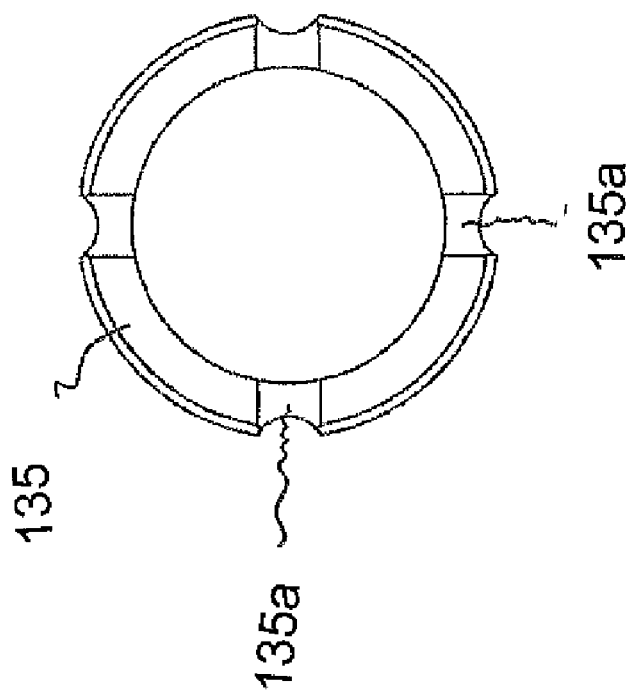
FIG. 10B is an end view of the present thrust washer shown in FIG. 10A.
Figure 10A:
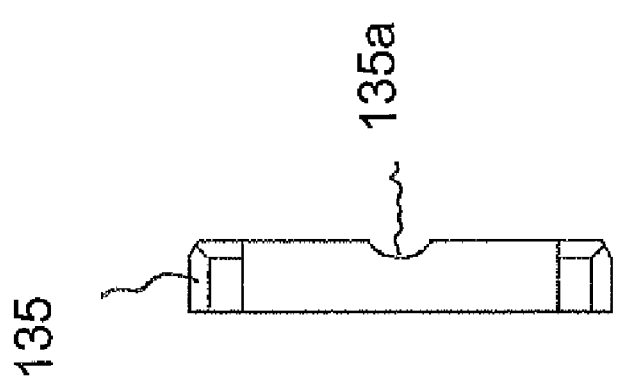
FIG. 10A is a longitudinal cross-section of a thrust washer of the present invention.

Front cover pilot 127' also includes a counterbore 127b' wherein a thrust washer 135 (FIGS. 10A-10B) is installed. Thrust washer 135 absorbs the axial thrust of the turbine shaft (not shown) in the GM 4L80E transmission during operation. Semi-circular cutouts 135a provide lubrication to the contact surface of the thrust washer 135.

An adapter ring 130 (FIGS. 11A-11B) is also provided in the present invention to adapt the hybrid front cover assembly 125' for attachment to the GM 4L80E flexplate (not shown), which mounts on the engine crankshaft. Adapter ring 130 includes a pattern of bolt holes 133 which receive machine screws 134 (FIGS. 15A-15C) for engagement with threaded bosses 126 on the front cover assembly 125' of the present torque converter 100'. Adapter ring 130 also includes an array of threaded holes 136, which receive additional machine screws (not shown) for attachment to the GM 4L80E flexplate.

In a method of the present invention, the stock GM 4T40E torque converter assembly 100 undergoes multiple machining operations to remove the OEM impeller hub 106, OEM turbine hub 111, and OEM front cover pilot 127 from the GM 4T40E torque converter, which are replaced by their counterparts in the present invention and such method will now be described.

Figure 12B:
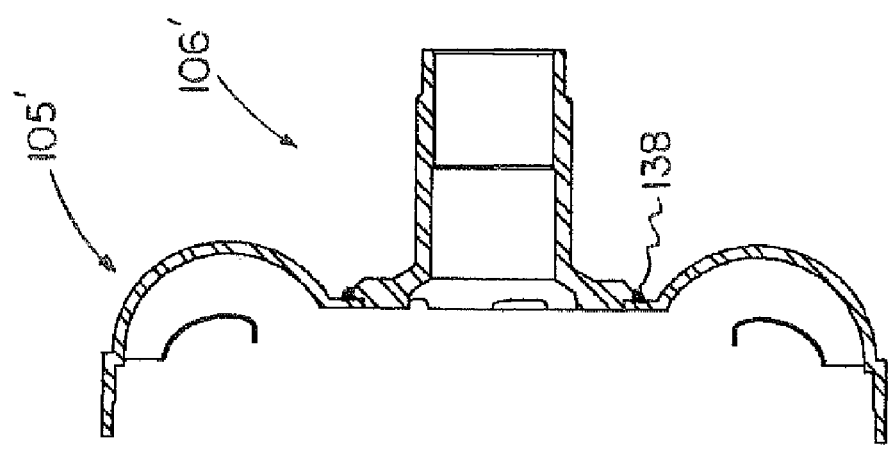
FIG. 12B is a longitudinal cross-section of the present impeller hub shown installed on the impeller assembly of the present invention.
Figure 12A:
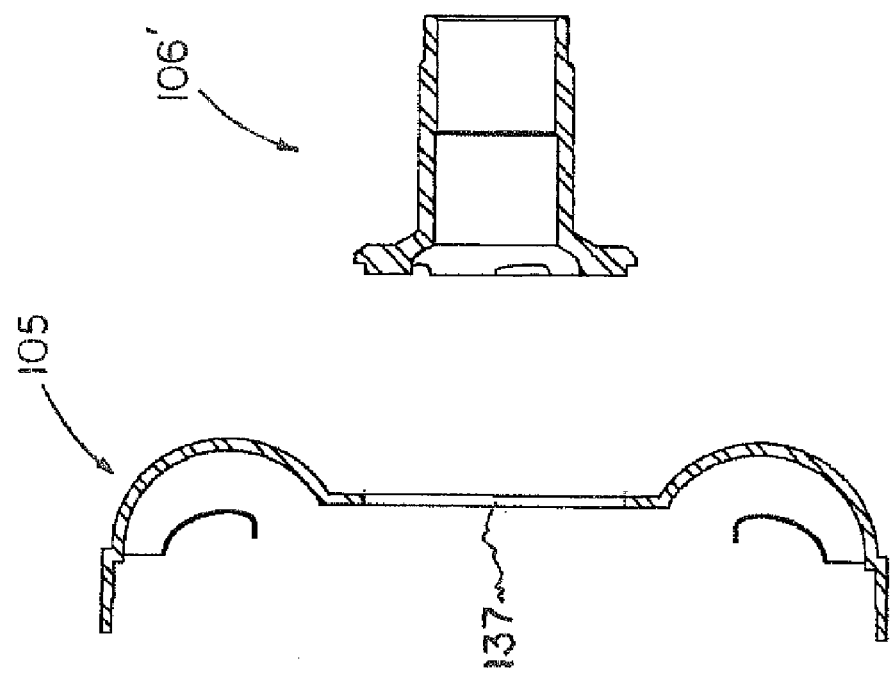
FIG. 12A is a longitudinal cross-section of the present impeller hub shown in proximity to the OEM impeller of the GM 4T40E torque converter core after removal of the OEM impeller hub.

Referring to FIGS. 12A-12B, the OEM impeller hub 106 (FIGS. 5A-5B) is removed from the OEM impeller 105 by machining on an engine lathe or by another machining technique leaving a cylindrical opening 137 of a predetermined diameter. Thereafter, the present hybrid impeller hub 106' is received in opening 137 and attached in concentric relation to the OEM impeller 105 by weldment as at 138 (FIG. 12B) to form the impeller assembly 105' for use in the hybrid GM 4L80E torque converter.

Figure 13B:
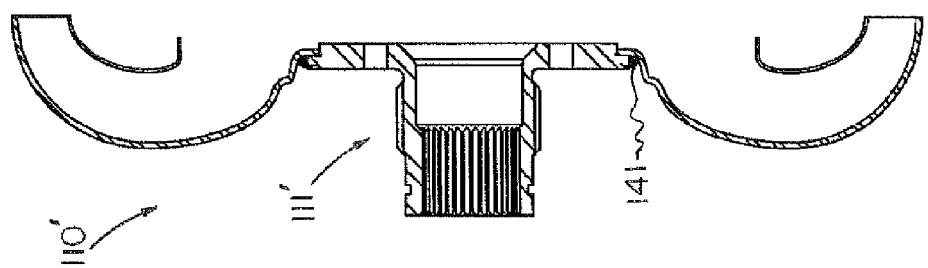
FIG. 13B is a longitudinal cross-section of the present turbine hub shown installed on the turbine assembly of the present invention.
Figure 13A:
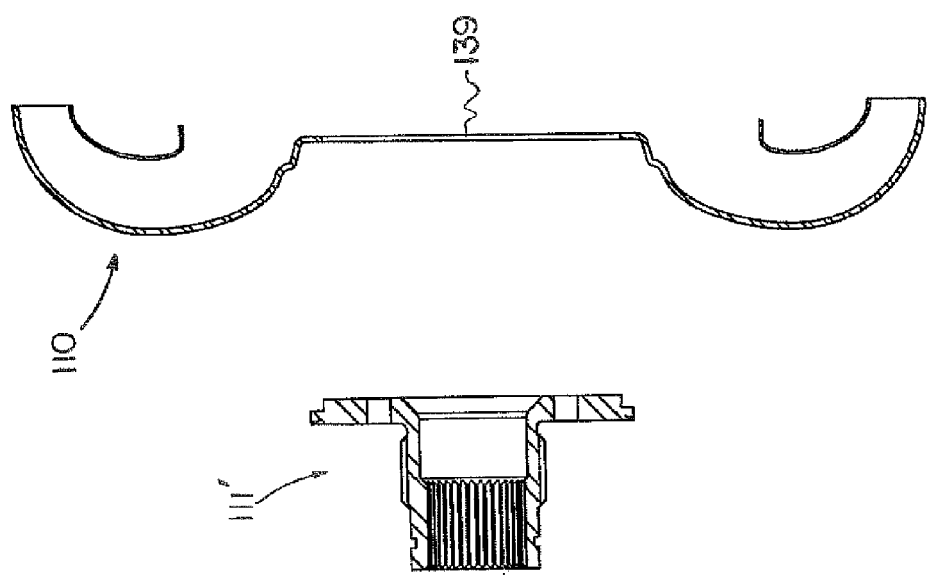
FIG. 13A is a longitudinal cross-section of the present turbine hub shown in proximity to the OEM turbine of the GM 4T40E torque converter after removal of the OEM turbine hub.

Similarly, the OEM turbine hub 111 (FIGS. 7A-7B) is removed from the OEM turbine 110 by machining on an engine lathe or by another machining technique leaving a cylindrical opening 139 of a predetermined diameter as shown in FIGS. 13A-13B. Thereafter, the present flanged turbine hub 111' is received in opening 139 and attached in concentric relation to the OEM turbine 110 by weldment as at 141 to form the present hybrid turbine assembly 110' (FIG. 13B) for use in the present invention.

Figure 14B:
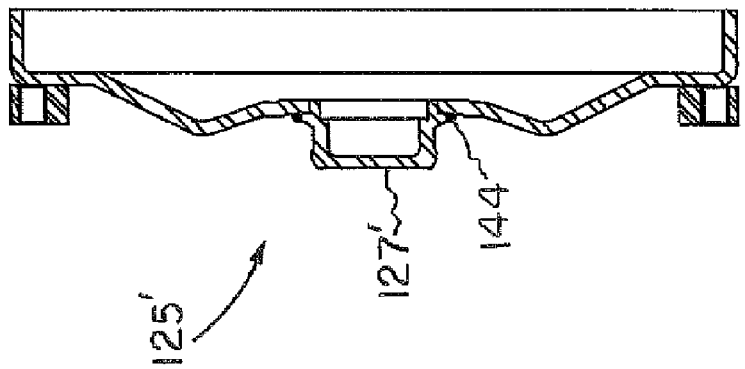
FIG. 14B is a longitudinal cross-section of the present front cover pilot shown installed on the front cover assembly of the present invention.
Figure 14A:
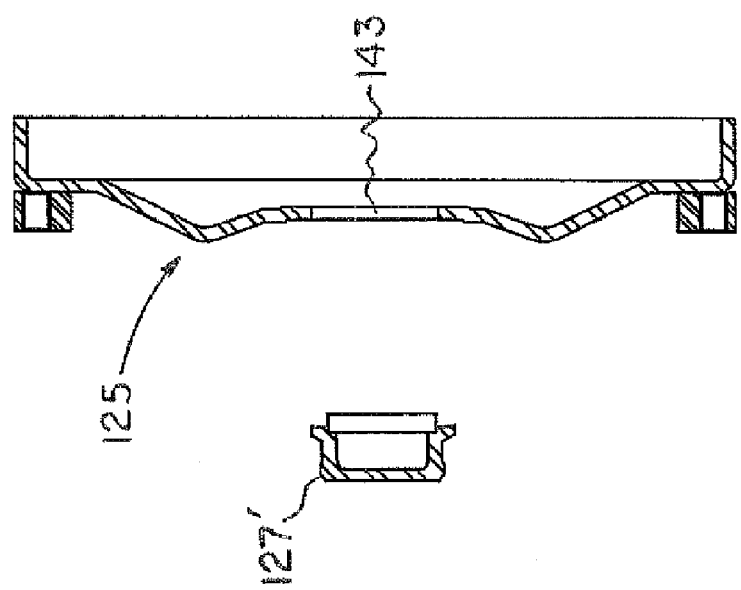
FIG. 14A is a longitudinal cross-section of the present front cover pilot shown in proximity to the front cover of the GM 4T40E torque converter after removal of the OEM front cover pilot.

To convert the front cover assembly 125 of the GM 4T40E for use with the GM 4L80E transmission, the OEM cover pilot 127 (FIG. 1) is removed from the OEM front cover 125 by machining on an engine lathe or another machining process leaving a cylindrical opening 143 of a predetermined diameter as shown in FIGS. 14A-14B. Thereafter, the present hybrid cover pilot 127' is received in opening 143 and attached in concentric relation to the front cover assembly 125 by weldment as at 144 to form the present hybrid front cover assembly 125' in accordance with the present invention.

Referring now to FIGS. 15A-15C adapter ring 130 is attached to the present front cover assembly 125; by machine screws 134 which extend through bolt holes 133 to engage the threaded bosses 126 attached to the present front cover assembly 125; (FIG. 15B). Adapter ring 130 (FIG. 11B) also includes an array of six threaded holes 136, which receive machine screws for attachment of the adapter ring to the engine flexplate (not shown). Thrust washer 135 is installed within counterbore 127b' formed in the cover plot 127' as shown in FIG. 15C.

To convert the OEM stator 115 of the GM 4T40E for use with the hybrid GM 4L80E torque converter, the inner race 114b (FIG. 2) of the OEM one-way roller clutch 114 is replaced by the present hybrid inner race 114b' (FIGS. 8A-8B), which includes an internal spline 114c' (i.e. 37 teeth internal) that is configured for engagement with the GM 4L80E stator shaft. It is reiterated that internal spline 114c' features so-called missing teeth 114d' disposed at 120 degree intervals to provide for axial ATF flow between the internal spline 114c' and the stator shaft (not shown) to the torque converter assembly 100' thereby providing critical lubrication within the torque converter assembly 100'.

Although not specifically illustrated in the drawings, it should be understood that additional equipment and structural components will be provided as necessary and that all of the components described above are arranged and supported in an appropriate fashion to form a complete and operative hybrid GM 4L80E torque converter assembly and conversion method incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

Having described preferred embodiments of our invention, what I desire to secure by U.S. Letters Patent is:

1. A hybrid GENERAL MOTORS 4L80E torque converter race kit for use in a combination with a GENERAL MOTORS 4T40E torque converter core for installation in a GENERAL MOTORS 4L80E automatic transmission, wherein said GENERAL MOTORS 4T40E torque converter core comprises an original equipment impeller assembly including a stock impeller and a stock impeller hub, and original equipment turbine assembly including a stock turbine and a stock turbine hub, an original equipment stator assembly including a stock stator and a stock one-way roller clutch have a stock inner race, an original equipment front cover assembly having a stock front cover pilot, and an original equipment lock-up clutch assembly, said hybrid GENERAL MOTORS 4L80E torque converter race kit comprising:

a hybrid GENERAL MOTORS 4L80E compatible impeller hub for replacement of said stock impeller hub;

a hybrid GENERAL MOTORS 4L80E compatible turbine hub for replacement of said stock turbine hub;

a hybrid GENERAL MOTORS 4L80E compatible inner race for replacement of said stock inner race in said stock one-way roller clutch;

a hybrid GENERAL MOTORS 4L80E compatible front cover pilot for replacement of said stock front cover pilot in said stock front cover assembly;

an adapter plate for attachment to said stock front cover assembly; and a set of machine screws for attachment of said adapter plate onto said stock front cover assembly.

2. A hybrid GENERAL MOTORS 4L80E torque converter race kit of claim 1 wherein said hybrid GENERAL MOTORS 4L80E compatible impeller hub is configured for driving engagement with a pump gear disposed within said GENERAL MOTORS 4L80E automatic transmission.

3. A hybrid GENERAL MOTORS 4L80E torque converter race kit of claim 1 wherein said hybrid GENERAL MOTORS 4L80E compatible turbine hub includes an internal spline having 35 teeth for mating engagement with said GENERAL MOTORS 4L80E automatic transmission.

4. A hybrid GENERAL MOTORS 4L80E torque converter race kit of claim 3 wherein said hybrid GENERAL MOTORS 4L80E compatible turbine hub also includes an external spline having 30 teeth for mating engagement with said original equipment lock-up clutch assembly.

5. A hybrid GENERAL MOTORS 4L80E torque converter race kit of claim 3 wherein said hybrid GENERAL MOTORS 4L80E compatible turbine hub also includes an external spline having 37 teeth for mating engagement with said GENERAL MOTORS 4L80E automatic transmission.

* * * * *